United States Patent Office 3,647,736
Patented Mar. 7, 1972

3,647,736
HYDROPHILIC CONTACT LENS MATERIAL
David G. Ewell, Richmond, Calif., assignor to Kontur Kontact Lens Company, Inc., Richmond, Calif.
No Drawing. Filed May 25, 1970, Ser. No. 40,456
Int. Cl. C08f *19/00, 33/04;* G02c *7/04*
U.S. Cl. 260—29.6 WB                5 Claims

ABSTRACT OF THE DISCLOSURE

A hydrogel of a hydrophilic polymer formed from a major proportion of a hydroxyalkyl methacrylate and a minor portion of a polyalkene lactam, its preparation and use as a soft corneal contact lens.

BACKGROUND OF THE INVENTION

This invention relates to a contact lens body formed from a hydrogel of a hydrophilic polymer and its method of preparation.

It is known that copolymerization of a monomer having a polymerizable vinyl group, such as styrene, with a small amount of a monomer having two such groups, such as divinyl benzene, in an organic solvent solution, results in a gel in the form of the corresponding cross-linked polymer. It is also known that hydrogels useful as soft contact lenses can be prepared from a polymerizible monoester of an olefinic acid selected from the group consisting of acrylic and methacrylic acid and a polymerizable diester of one of these acids; see U.S. Pat. No. 3,220,960, issued Nov. 30, 1965.

SUMMARY OF THE INVENTION

It has now been found that certain other hydrogels, resulting from the polymerization of polyalkene lactams, such as polyvinyl pyrrolidone, with a hydroxyalkyl methacrylate such as 2-hydroxyethyl methacrylate, are especially useful as hydrophilic contact lens material. The hydrogels of this invention have been found to retain an unusually high ratio of water relative to their weight as a dry substance. In their hydrated condition they are elastically deformable under relatively small pressure but virtually immune to actual plastic deformation. They are generally colorless or virtually colorless, and can be prepared so as to be optically clear. They are especially useful as contact lenses because they form semi-permeable membranes which permit passage of water and certain water-soluble materials therethrough.

The hydrogels of this invention are produced by copolymerizing a lactam polymer with a methacrylate in the presence of a free radical source. Preferred starting materials for producing the hydrogels of this invention include lactams, having a molecular weight of 160,000 or even higher, such as polyvinyl pyrrolidone, polyvinyl piperidone and polyvinyl caprolactam, with polyvinyl pyrrolidone being especially attractive. Suitable methacrylates include 2-hydroxyethyl methacrylate and 3-hydroxypropyl methacrylate as well as the corresponding acrylates that may be substituted for the methacrylates. Although the weight ratio of lactam to methacrylate can be varied widely, best results are obtained in the lactam: methacrylate range of about 1:1 to 1:5, with 1:3 to 1:4 being preferred.

Suitable catalysts include various "peroxy" containing materials such as t-butyl perbenzoate, t-butyl pivalate; diacyl peroxides such as lauroyl peroxide, benzoyl peroxide; dialkyl peroxides such as t-butyl peroxide; and the like. The catalyst is employed in conventional amounts of usually less than 1% by total weight. Larger quantities can usually be employed without adverse effects.

The preparation of the hydrogels of this invention is accomplished in the usual manner well known to those skilled in this art. Thus, the polyalkene lactam and the hydroxyalkyl methacrylate can first be thoroughly mixed. The catalyst is then added and the composition placed in a mold, preferably in a shape complementary to the ultimate desired shape of a blank for a contact lens. Typical mold shapes include short cylindrical molds with a convex bottom surface. The composition is thereafter subjected to a curing operation which can be in various stages including a pre-cure and an ultimate curing, depending on the catalyst employed. Thereafter the resulting lens blank is ground to the prescribed dimensions to provide the desired refractive power.

A more detailed description of the preparation of the ultimate contact lens is disclosed in the commonly owned, co-pending patent application for Cornea Protecting Device, bearing Ser. No. 40,178, and filed simultaneously with the present application. The disclosure of that patent application is incorporated herein by reference.

DESCRIPTION OF THE PREFERRED EMBODIMENT

To further illustrate the process of this invention, the following examples are provided. It is to be understood that the details thereof are not to be regarded as limitations as they may be varied as will be understood by one skilled in this art.

Example I

Polyvinyl pyrrolidone in an amount of 27.2% by weight, 2-hydroxyethyl methacrylate, in an amount of 72.0% by weight and t-butyl perbenzoate catalyst in an amount of 0.8% by weight were thoroughly mixed in a beaker. The contents were poured into a number of small cylindrically shaped molds having convex shaped lower surfaces. The molds were introduced into a microwave oven and precured for about 8 seconds. Then the molds were transferred to a chimney oven and held at 220° F. for about 1 hour where curing was completed. The hardened material was removed from the molds and ground into lenses to provide the specific corrections required. When the lenses were allowed to soak in a saline solution, they were found to uniformly absorb from ⅓ to ½ their weight, in water.

Example II

Into a 1,000 mm. beaker was added 500 ml. of 2-hydroxyethyl methacrylate, 300 ml. of polyvinyl pyrrolidone, 200 ml. of water and 0.5% by weight t-butyl perbenzoate. The composition was treated in the manner set forth in Example I and the resulting materials were found to have corresponding characteristics.

Although the foregoing invention has been described in detail by way of illustration and example for purposes of clarity and understanding, it is understood that certain changes and modifications may be practiced within the spirit of the invention as limited only by the scope of the appended claims.

I claim:

1. A hydrogel of a hydrophilic polymer, especially adapted for use as a contact lens, comprising: polymer obtained by copolymerizing a major portion of a hydroxyalkyl acrylate and a minor portion of a poly(N-vinyl lactam).

2. A hydrogel of a hydrophilic polymer, especially adapted for use as a contact lens, comprising: polymer obtained by copolymerizing a major portion of a hydroxyalkyl acrylate and a minor portion of a poly(N-vinyl lactam) selected from polyvinyl pyrrolidone, polyvinyl piperidone and polyvinyl caprolactam.

3. A hydrogel in accordance with claim 2 wherein the weight ratio of acrylate to poly-(N-vinyl lactam) is in the range of 5:1 to 1:1.

4. A hydrogel in accordance with claim 3 wherein the weight ratio of acrylate to poly-(N-vinyl lactam) is within the range of 3:1 to 4:1.

5. A hydrogel in accordance with claim 2 wherein the acrylate is selected from 2-hydroxyethyl methacrylate, 3-hydroxypropyl methacrylate, 2-hydroxyethyl acrylate and 3-hydroxypropyl acrylate.

References Cited

UNITED STATES PATENTS

| 3,026,296 | 3/1962 | Murdock et al. | 260—45.5 |
| 3,083,177 | 3/1963 | Armen et al. | 260—45.5 |
| 3,086,956 | 4/1963 | Armen et al. | 260—45.5 |
| 3,220,960 | 11/1965 | Wichterle et al. | 260—2.5 |
| 3,361,858 | 1/1968 | Wichterle | 264—1 |
| 3,408,429 | 10/1968 | Wichterle | 264—1 |
| 3,462,385 | 8/1969 | Barabas et al. | 260—29.6 |
| 3,496,254 | 2/1970 | Wichterle | 264—1 |

HAROLD D. ANDERSON, Primary Examiner

E. A. NIELSEN, Assistant Examiner

U.S. Cl. X.R.

260—29.6 WB, 885; 264—1; 351—160